US009701425B2

United States Patent
Lee et al.

(10) Patent No.: US 9,701,425 B2
(45) Date of Patent: Jul. 11, 2017

(54) APPARATUS AND METHOD OF CHARGING AND HOUSING OF UNMANNED VERTICAL TAKE-OFF AND LANDING (VTOL) AIRCRAFT

(71) Applicant: KOREA AEROSPACE RESEARCH INSTITUTE, Daejeon (KR)

(72) Inventors: Sang Cherl Lee, Daejeon (KR); Dong Young Rew, Daejeon (KR); Eun Sup Sim, Daejeon (KR); Gi Hyuk Choi, Daejeon (KR); Dong Hyun Cho, Daejeon (KR); Hae Dong Kim, Daejeon (KR); Jeong Hoon Kim, Seoul (KR); In Kyu Kim, Daejeon (KR); Sang Man Moon, Daejeon (KR); Sang Hyuck Han, Daejeon (KR); Sung Tae Moon, Daejeon (KR); Jin Young Suk, Daejeon (KR); Jin-Won Kim, Daejeon (KR); Tae Soo No, Jeongu-si (KR); Hyeon Cheol Gong, Daejeon (KR); Min Ki Kim, Daejeon (KR); Jong Chul Kim, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 298 days.

(21) Appl. No.: 14/384,382

(22) PCT Filed: Dec. 13, 2013

(86) PCT No.: PCT/KR2013/011621
§ 371 (c)(1),
(2) Date: Sep. 10, 2014

(87) PCT Pub. No.: WO2015/026018
PCT Pub. Date: Feb. 26, 2015

(65) Prior Publication Data
US 2016/0009413 A1  Jan. 14, 2016

(30) Foreign Application Priority Data

Aug. 23, 2013 (KR) .................. 10-2013-0100259
Oct. 21, 2013 (KR) .................. 10-2013-0125151

(51) Int. Cl.
*G06F 19/00* (2011.01)
*G06G 7/70* (2006.01)
(Continued)

(52) U.S. Cl.
CPC ............ *B64F 1/222* (2013.01); *B64C 39/024* (2013.01); *B64F 1/007* (2013.01); *B64F 1/362* (2013.01);
(Continued)

(58) Field of Classification Search
CPC ........ B64C 2201/141; B64C 2201/145; B64C 2201/208; B64C 39/024; B64F 1/007;
(Continued)

(56) References Cited

U.S. PATENT DOCUMENTS 4,236,686 A  12/1980 Barthelme et al.
4,255,911 A  3/1981 Beacom, deceased et al.
(Continued)

FOREIGN PATENT DOCUMENTS

CN  102126553 A  7/2011
EP  2259589 A2  12/2010
(Continued)

OTHER PUBLICATIONS

Extended European Search Report from European Application No. 13875320.7, dated Mar. 21, 2017.

*Primary Examiner* — Harry Oh
(74) *Attorney, Agent, or Firm* — McDermott Will & Emery LLP

(57) ABSTRACT

An apparatus and method of charging and housing of an unmanned vertical take-off and landing (VTOL) aircraft is
(Continued)

disclosed. The apparatus can accommodate an aircraft, and the apparatus includes a landing platform on which the aircraft lands, a housing portion to monitor state data by housing or charging the aircraft, and a sensor to assist in landing of the aircraft by allowing the aircraft to communicate with the apparatus. The apparatus enhances operational efficiency by reducing a travel time of the aircraft.

19 Claims, 14 Drawing Sheets

(51) Int. Cl.
| | | |
|---|---|---|
| B64F 1/22 | (2006.01) | |
| B64F 1/00 | (2006.01) | |
| B64C 39/02 | (2006.01) | |
| B64F 1/36 | (2017.01) | |
| G05D 1/04 | (2006.01) | |
| G08G 5/00 | (2006.01) | |
| G08G 5/02 | (2006.01) | |
| E04H 6/44 | (2006.01) | |

(52) U.S. Cl.
CPC .......... *G05D 1/042* (2013.01); *G08G 5/0013* (2013.01); *G08G 5/0069* (2013.01); *G08G 5/025* (2013.01); *B64C 2201/042* (2013.01); *B64C 2201/141* (2013.01); *B64C 2201/145* (2013.01); *B64C 2201/208* (2013.01); *E04H 6/44* (2013.01)

(58) Field of Classification Search
CPC .......... B64F 1/222; E04H 6/44; G05D 1/042; G08G 5/0013; G08G 5/0069; G08G 5/025
USPC .......................................................... 701/16
See application file for complete search history.

(56) References Cited

U.S. PATENT DOCUMENTS

| | | | | |
|---|---|---|---|---|
| 5,687,930 A * | 11/1997 | Wagner | .................... | B64F 1/125 244/116 |
| 6,193,190 B1 * | 2/2001 | Nance | ..................... | B64F 1/007 244/114 R |
| 6,314,366 B1 * | 11/2001 | Farmakis | .............. | B60R 25/102 340/961 |
| 8,162,256 B2 * | 4/2012 | Goossen | ................ | B64C 39/024 244/110 E |
| 8,511,606 B1 * | 8/2013 | Lutke | .................... | B64C 39/028 244/100 R |
| 9,007,236 B2 * | 4/2015 | Lewis | ........................ | B64F 1/20 244/114 R |
| 9,020,666 B2 * | 4/2015 | Ohtomo | ............... | G05D 1/0669 701/15 |
| 9,302,783 B2 * | 4/2016 | Wang | ......................... | B64F 1/00 |
| 2006/0280034 A1 * | 12/2006 | Howard | ................. | H04B 13/02 367/134 |
| 2007/0016371 A1 * | 1/2007 | Waid | ...................... | G01C 21/06 701/470 |
| 2007/0228214 A1 * | 10/2007 | Horak | .................... | A63H 27/14 244/63 |
| 2008/0243383 A1 * | 10/2008 | Lin | ...................... | G01C 21/165 701/469 |
| 2009/0314883 A1 * | 12/2009 | Arlton | ................... | B64C 39/024 244/63 |
| 2010/0302359 A1 | 12/2010 | Adams et al. | | |
| 2010/0320313 A1 * | 12/2010 | Hanafin | .................. | B64F 1/005 244/17.17 |
| 2011/0068224 A1 | 3/2011 | Kang et al. | | |
| 2012/0191274 A1 * | 7/2012 | Gomez Perez et al. | ... | B64F 1/02 701/18 |
| 2012/0242550 A1 * | 9/2012 | Snyder | ................... | H02N 2/046 343/745 |
| 2012/0326923 A1 * | 12/2012 | Oehler | ................. | G01S 5/0284 342/357.29 |
| 2013/0000539 A1 * | 1/2013 | Wolff | ........................ | B64F 1/02 114/261 |
| 2013/0141255 A1 * | 6/2013 | McDermott | ............. | B64F 1/18 340/955 |
| 2013/0208256 A1 * | 8/2013 | Mamidipudi | ......... | G01S 7/4811 356/4.01 |
| 2014/0010619 A1 * | 1/2014 | Dor-El | ..................... | E04H 6/22 414/240 |

FOREIGN PATENT DOCUMENTS

| | | |
|---|---|---|
| EP | 2518580 A2 | 10/2012 |
| FR | 2986647 A3 | 8/2013 |
| JP | 09-302628 | 11/1997 |
| KR | 2011-0022211 A | 3/2011 |
| KR | 2011-0024616 A | 3/2011 |
| KR | 2011-0090326 A | 8/2011 |
| KR | 10-1091107 B1 | 9/2011 |
| KR | 10-1116831 B1 | 5/2012 |

* cited by examiner

APPARATUS AND METHOD OF CHARGING AND HOUSING OF UNMANNED VERTICAL TAKE-OFF AND LANDING (VTOL) AIRCRAFT

TECHNICAL FIELD

The present invention relates to an apparatus and method of charging and housing of an unmanned vertical take-off and landing (VTOL) aircraft, and more particularly, to an apparatus and method of charging and housing of an unmanned VTOL aircraft provided in a form of a fixed type station, and also in a portable form equipped with mobility.

BACKGROUND ART

Until recently, portable or fixed type stations have not been provided for automatic take-off and/or landing, charging, and housing of an unmanned vertical take-off and landing (VTOL) aircraft.

DISCLOSURE OF INVENTION

Technical Goals

An aspect of the present invention provides an apparatus and method of charging and housing of an unmanned vertical take-off and landing (VTOL) aircraft that enables automatic take-off and/or landing, charging, and housing of a plurality of unmanned VTOL aircrafts.

Another aspect of the present invention provides an apparatus and method of charging and housing of an unmanned VTOL aircraft that reduces a travel time of an aircraft and thus, curtails a scope of activities of the aircraft through a portable type of charging and housing of the aircraft.

Still another aspect of the present invention provides an apparatus and method of charging and housing of an unmanned VTOL aircraft that reduces waste of manpower resources and thus, operates a greater number of aircrafts through automatic housing and charging of a plurality of aircrafts.

Technical Solutions

According to an aspect of the present invention, there is provided an apparatus for charging and housing of an unmanned vertical take-off and landing (VTOL) aircraft. The apparatus (which may be, for example, seen as an accommodator) may accommodate an aircraft. The apparatus includes a landing platform to be provided at a side of the apparatus, and on which an aircraft lands, a housing portion to monitor state data by housing or charging the aircraft, and a sensor to assist in landing of the aircraft by allowing the aircraft to communicate with the apparatus.

The sensor may include at least one of a phase array antenna, an infrared (IR) ray lamp, a Lidar, a vision sensor, a sonar sensor, a beacon signal, a global positioning system (GPS) receiver or a differential global positioning system (DGPS) receiver, and the light emitting diode (LED)/IR array lamps. The communication between the aircraft and the apparatus may include at least one of an omni-antenna or a reflector antenna for satellite communication, a phase array antenna to trace a flight path of the aircraft, and a DGPS antenna. The Lidar may be provided inside the phase array antenna, is vertically movable, moves to an upper portion of the phase array antenna when in use for information associated with landing by implementing a three-dimensional (3D) map of a surrounding neighborhood, and moves down to be inserted to a lower portion of the phase array antenna when not in use.

The apparatus (which may be, for example, seen as a container) may accommodate a plurality of aircrafts and move the aircrafts. The apparatus includes an upper landing platform to be disposed on a top portion of the apparatus, and provided with a phase array radar or a Lidar, a lateral landing platform to be disposed at a side portion of the apparatus, and provided with a landing zone, and a rear landing platform to be disposed at a rear portion of the apparatus, and provided with a landing zone, wherein the lateral landing platform or the rear landing platform opens and closes, and when the lateral landing platform or the rear landing platform is folded, the aircraft accommodated in the landing platform is admitted inside the apparatus.

The landing zone may further include a fixer to be mechanically bonded to the aircraft. The apparatus may further include a latch in the fixer to be inserted and bonded to the aircraft. The apparatus may further include a power supply disposed in an outer peripheral portion of the landing zone to supply power. The charging of the aircraft may be performed using solar energy, power generated by an engine of the apparatus, or power from an external source.

The apparatus may further include an axis at a side of the apparatus, wherein a leftward and rightward horizontal movement of the landing platform is centered on the axis to open outward horizontally to the apparatus. A plurality of the landing portions may be disposed vertically at differing positions, and opens outwardly in a form of a drawer type.

The apparatus may include a tower in which a plurality of aircraft is disposed, a plurality of open type landing platforms to open horizontally, a bridge to open the open type landing platforms externally to the tower, a robotic arm disposed at a side of the tower to move the aircraft to the housing portion, and an elevator provided in the tower to horizontally or vertically move the robotic arm.

The open type landing platforms may open at intervals of differing phases rather than being based on a landing position. The apparatus may further include a maintenance room in the tower for a user to directly maintain the aircraft, or perform repairs in an occurrence of an anomaly in the aircraft.

According to an aspect of the present invention, there is provided a method for charging and housing of an unmanned VTOL aircraft, the method including identifying an aircraft and receiving information associated with a location of the aircraft, guiding the aircraft towards a direction of an apparatus for charging and housing of an unmanned VTOL aircraft, opening of a landing platform provided in the apparatus, landing of the aircraft on the landing platform, and housing and charging the aircraft and monitoring state data.

The landing of the aircraft on the landing platform, or the guiding of the aircraft towards the direction of the apparatus may include use of at least one of a Lidar, a vision sensor, a sonar sensor, a beacon signal, the LED/IR ray array lamps, an omni-antenna, a reflector antenna, a phase array antenna, and a GPS receiver or a DGPS receiver.

The landing of the aircraft on the landing platform may include calculating an optimal route based on collision avoidance amongst a plurality of aircrafts until the aircraft lands on the landing platform, and transmitting a landing route to the plurality of aircrafts. The identifying of the aircraft and receiving the information associated with the location of the aircraft, and the guiding of the aircraft towards the direction of the apparatus may include using the aircraft location information in determining a landing route using a GPS or a DGPS device provided inside the aircraft, and using the aircraft location information in active controlling of the aircraft and determining the landing route by receiving information associated with attitude and altitude data or a heading angle received from an inertial measurement unit (IMU) and an attitude heading reference system (AHRS).

Accordingly, the apparatus and method of charging and housing of the unmanned VTOL aircraft may reduce a travel time of an aircraft by charging and housing a plurality of aircrafts to be moved. Also, the apparatus and method of charging and housing of the unmanned VTOL aircraft may enhance efficiency of charging and housing by disposing the plurality of aircrafts inside the apparatus for a greater effect in terms of space utilization.

Effects of Invention

According to embodiments of the present invention, it is possible to enhance operational efficiency through portable charging and housing of a plurality of aircrafts, and thus, reduce travel times of the aircrafts.

According to embodiments of the present invention, it is possible to increase space utilization by disposing a plurality of aircrafts.

According to embodiments of the present invention, it is possible to operate a greater number of aircrafts by automatically charging and housing a plurality of aircrafts, and thus, reduce waste of manpower resources.

BEST MODE FOR CARRYING OUT THE INVENTION

Figure 1:
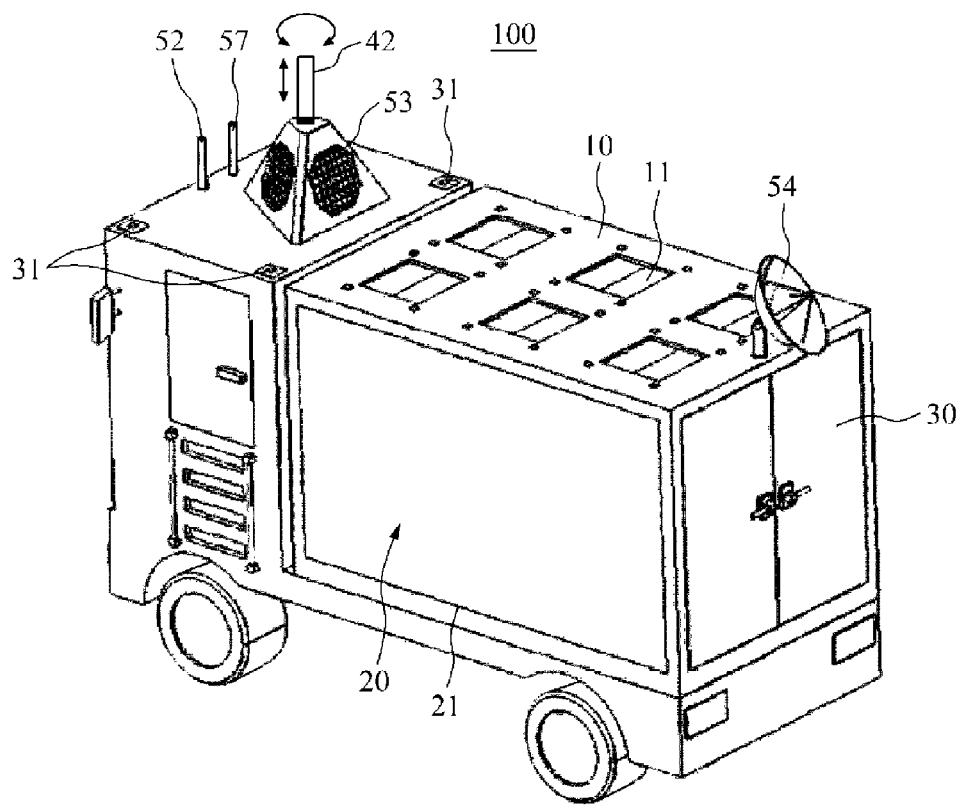
FIG. 1 is a perspective diagram illustrating a portable apparatus for charging and housing according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

According to FIGS. 1 through 9, a portable apparatus for charging and housing may refer to a portable station for charging and housing that enables automatic take-off and/or landing of a plurality of aircrafts by moving the apparatus (which may be, for example, seen as a container provided for charging and housing.

Figure 2:
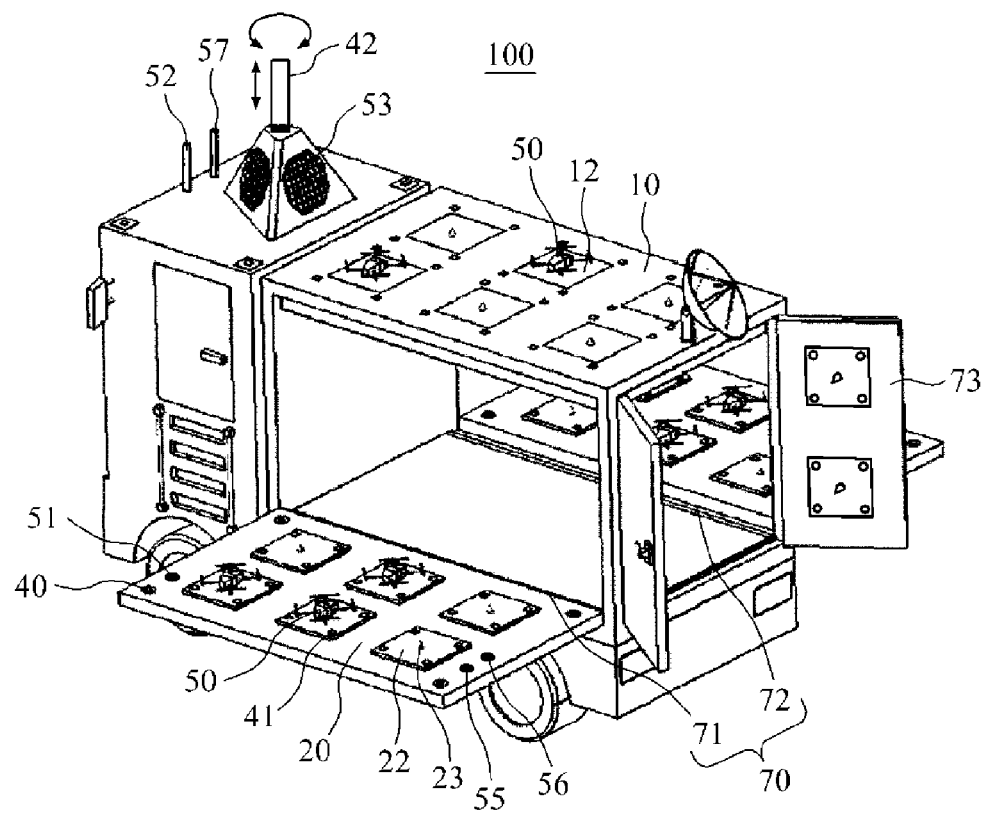
FIG. 2 is a phase diagram illustrating a portable apparatus for charging and housing in an outer wall opening type according to an embodiment of the present invention.

FIG. 1 is a perspective diagram illustrating a portable apparatus 100 for charging and housing according to an embodiment of the present invention, and FIG. 2 is a phase diagram illustrating the portable apparatus 100 for charging and housing in an outer wall opening type according to an embodiment of the present invention. Referring to FIGS. 1 and 2, a landing platform is provided on a top portion, a lateral portion, and a rear portion of the apparatus 100. The landing platform includes an upper landing platform 10 on the top portion of the apparatus 100, a lateral landing platform 20 at a side, and a rear landing platform 73. The upper landing platform 10 on the top portion of the apparatus 100 includes an upper landing zone 12, an opener/closer 11, and a fixer 23. For example, an aircraft 50 is disposed in the fixer 23 provided on the upper landing zone 12 to be housed and charged, and move vertically. When the aircraft 50 takes off, the upper landing zone 12 climbs to open the opener/closer 11, and when the aircraft 50 is housed, the upper landing zone 12 that accommodates the aircraft 50 descends so as to close the opener/closer 11, thus housing and charging the aircraft 50.

The fixer 23 to house or charge the aircraft 50 is provided in a form of a cone or an elliptical cone, and latches 24 are provided at both sides of the fixer 23 to fix the aircraft 50 for charging and housing.

The large-scale light emitting diode/infrared (LED/IR) array lamps 31 provided on a top portion of the apparatus 100 is configured to control guiding of the aircraft 50 by identifying a landing platform from a great altitude.

The lateral landing platform 20 provided at a side of the apparatus 100 includes a folder 70 of which a side door of the apparatus 100 is folded or closes on hinges. When an angle with a ground is 90 degrees, the lateral landing platform 20 closes, and when an angle with a ground is zero degrees, the lateral landing platform 20 opens.

The lateral landing platform 20 performs the opening using a first folder 71, a second folder 72, and the rear landing platform 73. For example, when the lateral landing platform 20 is at zero degrees and parallel to a ground, the aircraft 50 takes off or lands. When the lateral landing platform 20 is folded, the aircraft 50 is housed in the apparatus 100. The lateral landing platform 20 opens upwardly to a direction of the top portion of the apparatus 100, or opens downwardly to a direction of a base of the apparatus 100. For example, supports provided in a joint structure are employed at both sides of the apparatus 100 to open the lateral landing platform 20 to be parallel to a roof of the apparatus.

When the lateral landing platform 20 is closed, a solar panel 21 is provided externally at a side of the apparatus 100, and employed as an auxiliary source of power in addition to power generated by an engine of the apparatus 100. At another side of the apparatus 100, aside from the solar panel 21 at the one side, a plurality of lateral landing zones 22 is provided. Communication devices or sensors, for example, an IR ray sensor, an ultra sonic sensor, a Lidar, or a sonar sensor, may be provided to assist in automatic landing of the aircraft 50.

The LED/IR array lamps 41 for identifying aircraft in automatic landing of the aircraft 50, a vision sensor 40, an ultra sonic sensor 55, and a differential global positioning system (DGPS) or GPS receiver 57 are installed on the lateral landing platform 20, and the upper landing platform 10 to assist in automatic landing of the aircraft 50. A reflector antenna for satellite communication, a phase array antenna 53 to trace and communicate with multiple unmanned aircrafts, an omni-antenna 52 to communicate with multiple unmanned aircrafts, a satellite antenna 54, and a Lidar to create a three-dimensional (3D) map are provided on the top portion of the apparatus 100.

The Lidar 42 provided inside the phase array antenna 53 is vertically movable. For example, the Lidar 42 moves to an upper portion of the phase array antenna 53 when in use to be used for information associated with landing of an aircraft by implementing a 3D map of a surrounding neighborhood, and moves down to be inserted into a lower portion of the phase array antenna 53 when not in use.

A space for a human passage is provided inside the apparatus 100 to control an aircraft on a landing platform, and to maintain and repair in an occurrence of a malfunction of the aircraft.

Hereinafter, a sensor to assist in landing of the aircraft 50 will be described.

Location and state information of all aircrafts is transmitted to the apparatus 100 through a radio frequency (RF), and the apparatus 100 manually receives the location information of the aircrafts. The phase array antenna 53 actively evaluates the location information of the aircrafts at a remote distance.

Location information of the apparatus 100 is transmitted to the aircraft 50 through an RF using an electromagnetic wave of a beacon signal 51 emitted from the landing platform to guide the aircraft 50. When a landing port is designated and the aircraft 50 is informed of the landing port, the aircraft 50 stands by in midair hovering above the landing port. The landing platform guides landing based on attitude and altitude data and location information using a near-distance vision sensor, an ultrasonic sound for a near distance, a DGPS/GPS device, and The LED/IR array lamps.

Figure 3:
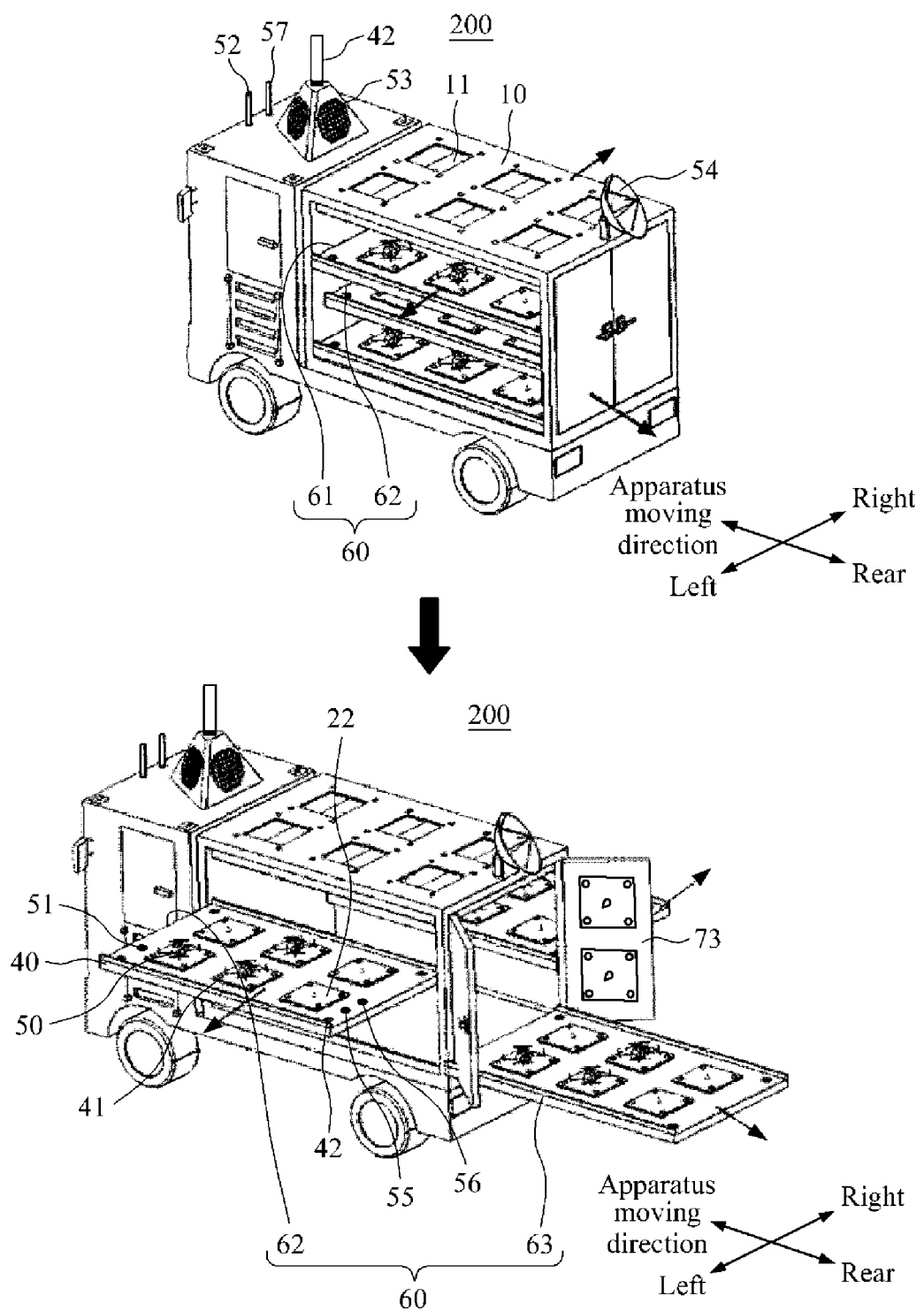
FIG. 3 is a configuration diagram illustrating a portable apparatus for charging and housing in a drawer type in which a landing platform opens in a drawer type as another example of FIG. 2.

FIG. 3 is a configuration diagram illustrating a portable apparatus 200 for charging and housing in a drawer type as another example of FIG. 2. The portable apparatus 100 for charging and housing in the outer wall opening type is configured in a manner in which the lateral landing platform opens or closes in a foldable type. However, the apparatus may be configured in various other forms, such as in a drawer type in which a landing platform opens in an opposite direction to a movement of the apparatus, for example, a leftward or rightward movement. For example, a protection cover (not shown) opens so as to slide into a bottom of the apparatus 200, allowing a landing platform layer 60 to be extended from or inserted into the apparatus 200 horizontally.

The landing platform layer 60 has an advantage of highly efficient space utilization through a form of a rail or a snap-in. The landing platform includes a plurality of accumulated layers, for example, the landing platform layer 60, so as to house a large number of aircrafts. For example, the landing platform includes a first landing platform layer 61, a second landing platform layer 62, and a third landing platform layer 63. The first landing platform layer 61 is withdrawn from the landing platform to a left side based on a moving direction of the apparatus 200, the second landing platform layer 62 is withdrawn from the landing platform to a right side, and the third landing platform layer 63 is withdrawn from the landing platform in an opposite direction to the moving direction of the apparatus 200. The plurality of layers is divided into sections to avoid overlapping of the layers, and accumulated vertically so as to house and charge a greater number of aircrafts. Descriptions previously provided with reference to FIG. 2 may be applied to configurations of the apparatus 200, housing and charging of aircrafts, and an operation of a sensor performed in the apparatus 200, aside from an operating method of opening the landing platform, and thus repeated descriptions will be omitted here for conciseness.

Figure 4:
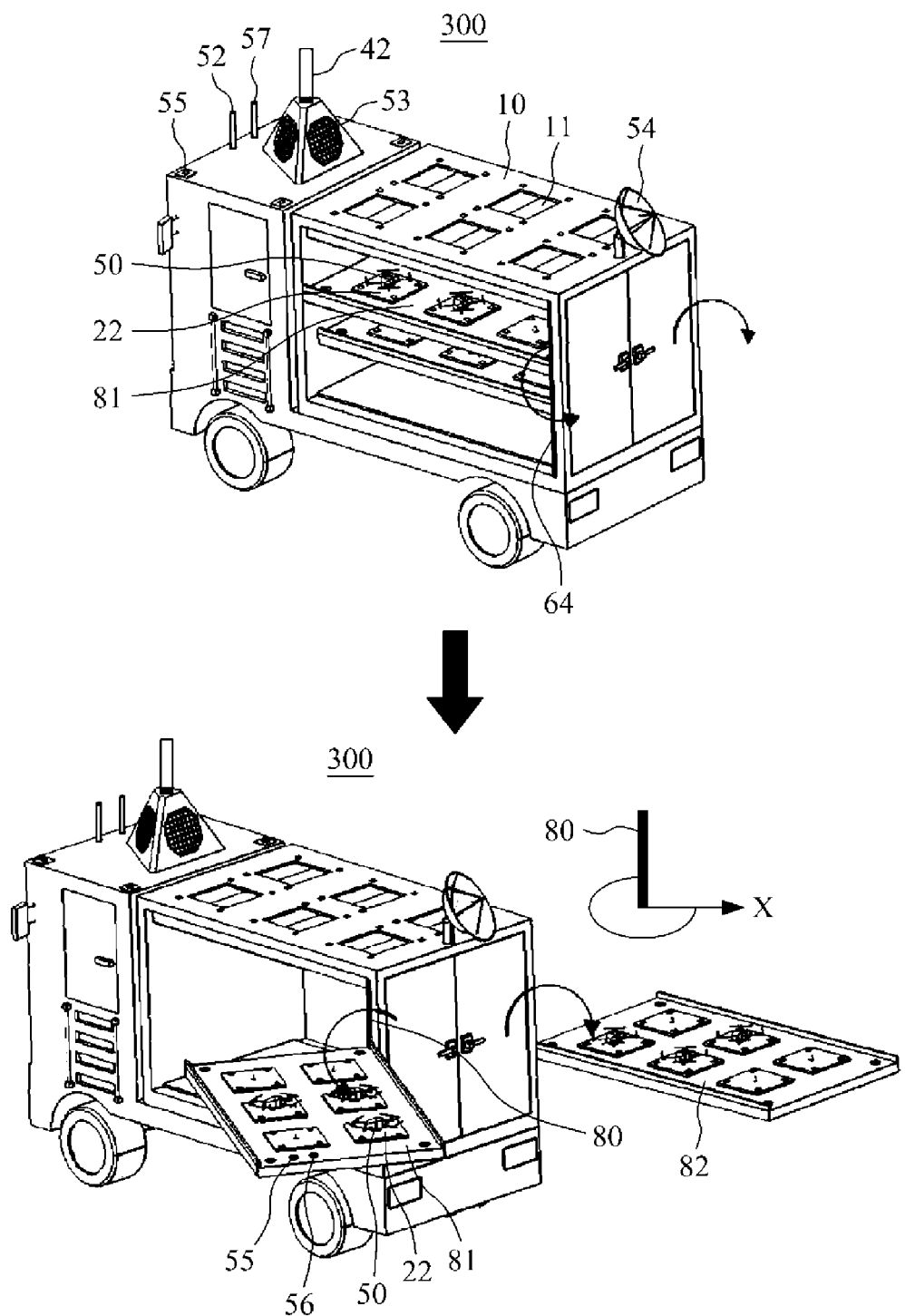
FIG. 4 is a configuration diagram illustrating a portable apparatus for charging and housing in a hinge type in which a landing platform opens in a hinge type as still another example of FIG. 2.

FIG. 4 is a configuration diagram illustrating a portable apparatus 300 for charging and housing in a hinge type in which a landing platform opens in a hinge type as still another example of FIG. 2. For example, a protection cover opens to be folded into a bottom of the apparatus 300. A hinge landing platform turns to a left and right side centered on an x axis 64 so as to be unfolded outwardly to the apparatus 300, or folded into the apparatus 300 to accommodate the landing platform or dispose the landing platform outside. In addition, a configuration in which hinge landing platforms 81 and 82 are supported at one point of the axis 64, and a configuration in which a support bar supports the hinge landing platform to disperse loads may be possible.

An axis 80 provided at both corners of a lateral portion of the apparatus 300 is a configuration in which the hinge landing platform is folded and unfolded leftward and rightward horizontally to dispose the landing platform outside the apparatus 300 or accommodate the landing platform inside the apparatus 300. By way of example, the first hinge landing platform 81 and the second hinge landing platform 82 are provided at a side of the apparatus 300, and a plurality of hinge landing platforms is disposed parallel to a ground. The first hinge landing platform 81 and the second hinge landing platform 82 are disposed at differing layers centered on the axis 80. The first hinge landing platform 81 and the second hinge landing platform 82 open in differing directions to dispose the landing platform outside or inside the apparatus 300. Descriptions previously provided with reference to FIG. 2 may be applied to configurations of the apparatus 300, housing and charging of aircrafts, and an operation of a sensor performed in the apparatus 300 and thus, repeated descriptions will be omitted here for conciseness.

Figure 5:
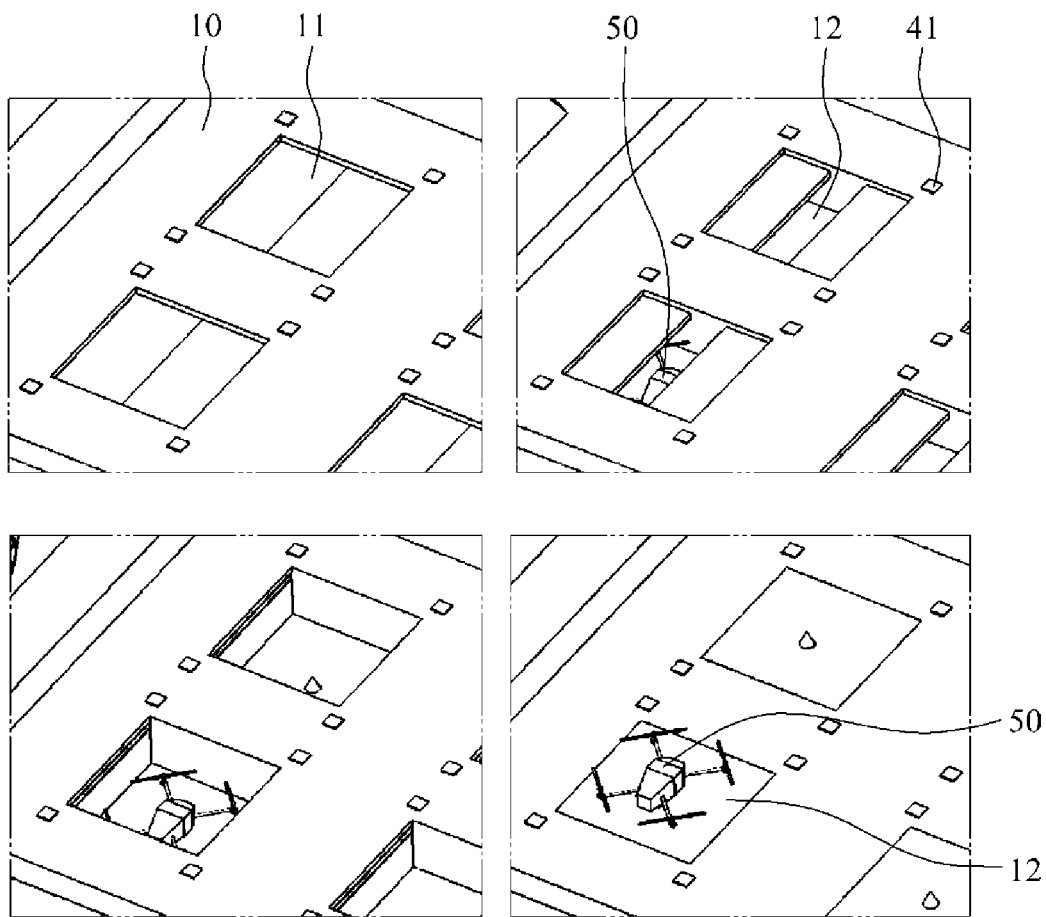
FIG. 5 is a phase diagram illustrating a process of operating an upper landing platform according to an embodiment of the present invention.
Figure 6:
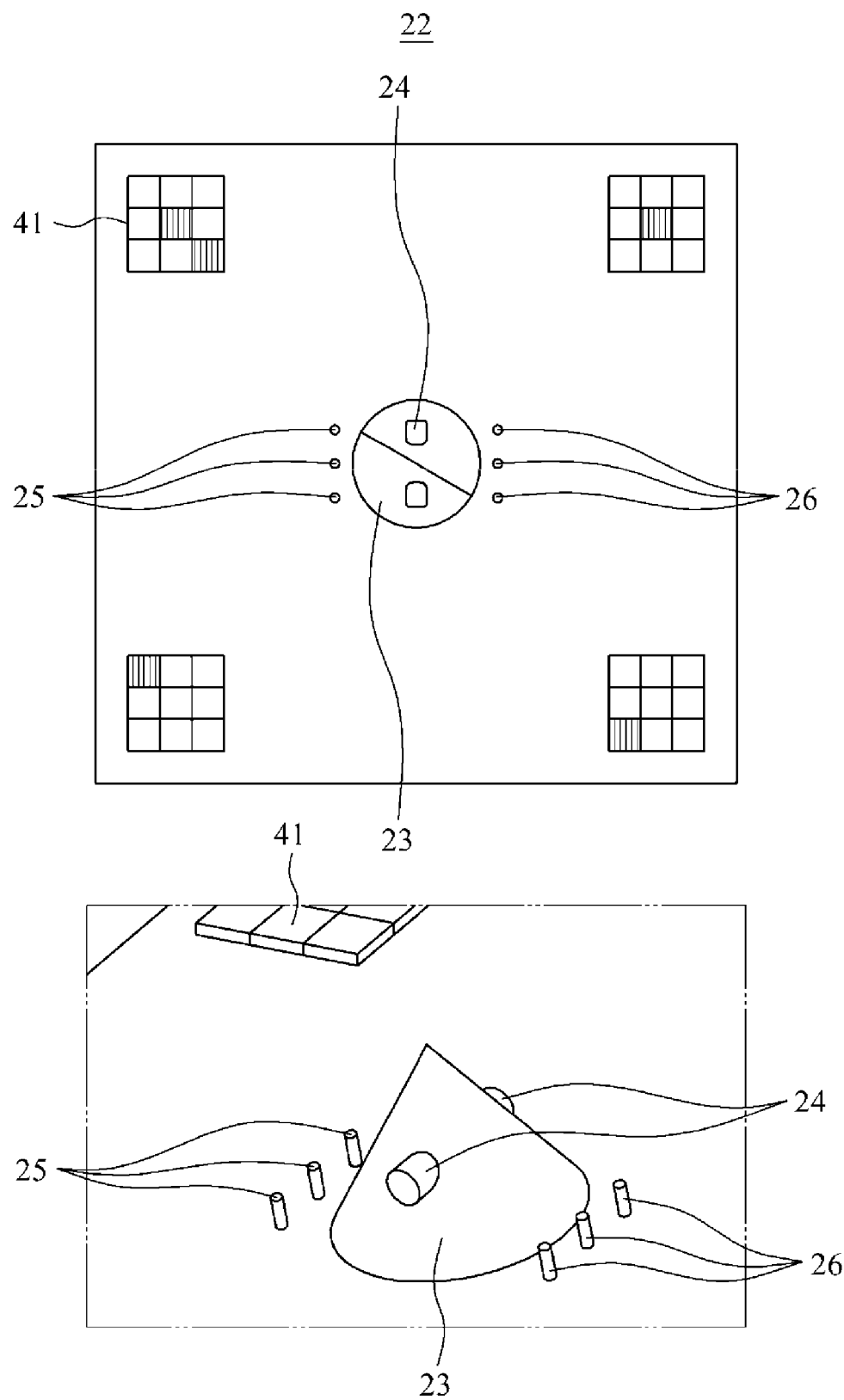
FIG. 6 is a diagram illustrating a fixer provided on a landing zone according to an embodiment of the present invention.

FIG. 5 is a phase diagram illustrating a process of operating an upper landing platform according to an embodiment of the present invention, and FIG. 6 is a diagram illustrating a first fixer for charging provided on a landing zone and a near distance landing guidance portion according to an embodiment of the present invention.

The upper landing platform 10 on a top portion of the apparatus includes the upper landing zone 12, the opener/closer 11, the fixer 23, and a landing guidance portion 41. The aircraft 50 is admitted into the fixer 23 provided on the upper landing zone 12 to perform state data monitoring, housing, and charging of the aircraft 50.

The upper landing zone 12 is configured to allow a vertical movement of the aircraft 50. When the aircraft 50 moves outside, the upper landing zone 12 ascends, and the opener/closer 11 opens. When the aircraft 50 is housed, the upper landing zone 12 descends, and the opener/closer 11 closes to house the aircraft 50.

The fixer 23 to perform housing, charging, and state data monitoring of the aircraft 50 is configured in a form of an elliptical cone. For example, the latches 24 are extended towards the aircraft 50 in which grooves are formed at both sides so as to connect the grooves of the aircraft 50 to the latches 24 simultaneously performed with landing of the aircraft 50 on the landing zone. The elliptical cone shape of the fixer 23 enables accurate contact of a lower portion of the aircraft 50 with the latches 24. Accordingly, when the aircraft 50 is connected to the grooves, a power supply 26 and a data monitoring unit 25 are simultaneously connected to the aircraft 50 to perform charging and monitoring on the aircraft 50.

The data monitoring unit 25 is disposed in a front of the fixer 23, and the power supply 26 to supply power to the aircraft 50 is provided at a rear of the fixer 23. For example, the latches 24 are extended from the cone of the fixer 23 to be connected to the aircraft 50, thus performing power supplying, monitoring, and charging and housing.

The LED/IR array lamps 41 for near distance landing guidance to assist in landing of the aircraft 50 is provided at a side of the upper landing zone 12 and the lateral landing zones 22. Landing zones are distinguished using a unique pattern, for example, LED lamps are emitted during a day, and an IR ray is emitted during a night to allow the aircraft 50 to detect such emitted lights and use as reference when landing. As shown in FIG. 6, predetermined patterns differing based on day and night are formed in an n×n array, of which a single cell includes both an IR array lamp and LED array lamps, and assist in automatic landing of the aircraft 50.

Figure 7:
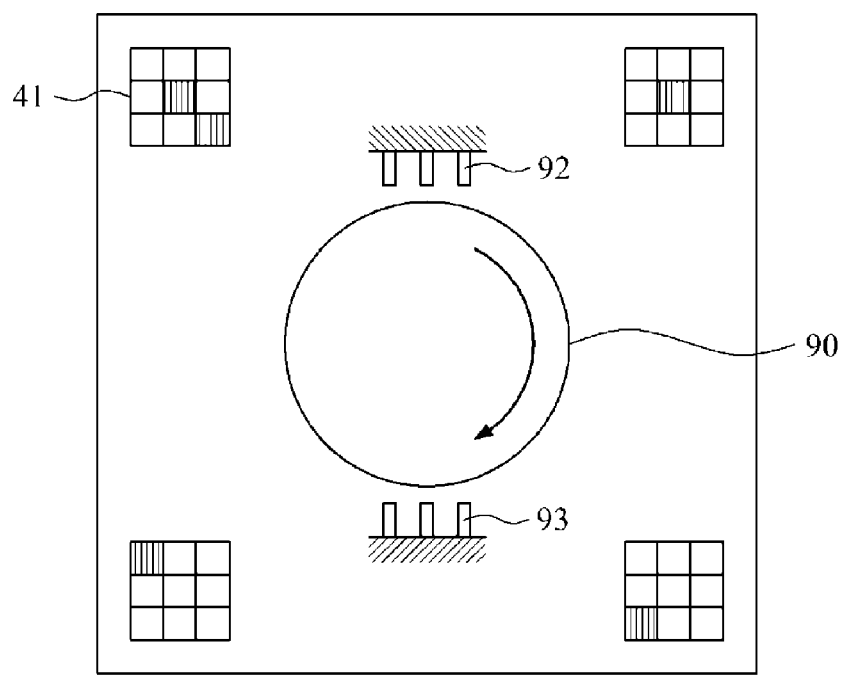
FIG. 7 is a configuration diagram illustrating a second fixer as another example of FIG. 6.

FIG. 7 is a configuration diagram illustrating a second fixer 90 as another example of FIG. 6. The second fixer 90 to perform housing, charging, and data monitoring of the aircraft 50 is configured in a form of a circle in a manner dissimilar to the fixer 23. When the aircraft 50 lands, an apparatus rotates and disposes the aircraft 50 at a second power supply 92 and a second data monitoring unit 93. When the aircraft 50 is disposed at an appropriate position, the latches 24 are inserted into the aircraft 50 to function as a fixer. The second power supply 92 and the second monitoring unit 93 provided on a lower portion of a landing platform are extended from a bottom in a form of a sharp-edged latch to be inserted into a groove of the aircraft 50, and perform charging and monitoring on the aircraft 50.

Figure 8:
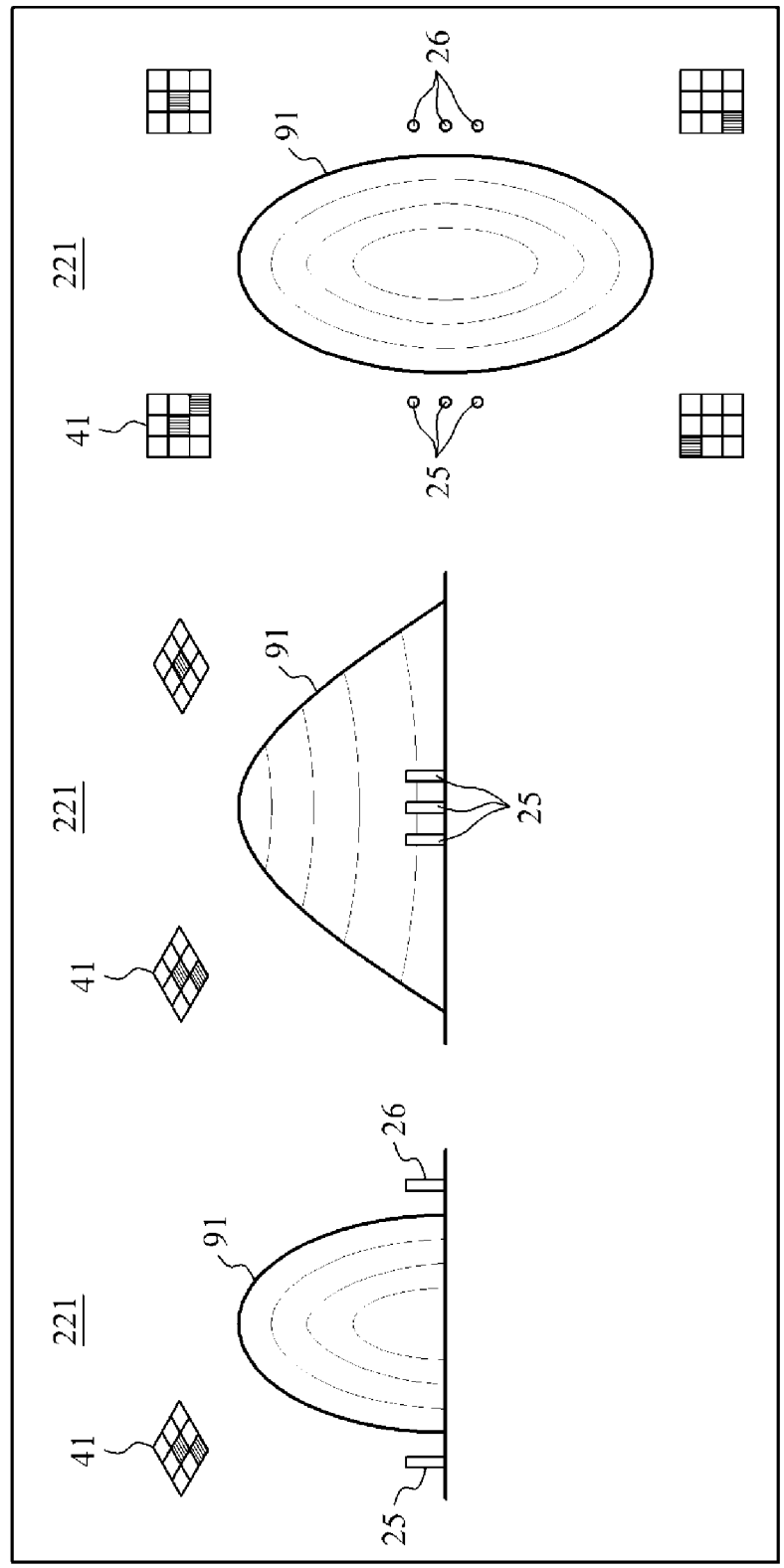
FIG. 8 is a configuration diagram illustrating a third fixer as still another example of FIG. 6.

FIG. 8 is a configuration diagram illustrating a third fixer 91 as still another example of FIG. 6. The third fixer 91 to perform housing, charging, and data monitoring of the aircraft 50 includes an elliptical base in a dissimilar manner to the second fixer 90. The third fixer 91 includes a plurality of differing diameters to fix the aircraft 50.

A hole is formed on a lower portion of the aircraft 50. When the hole and the third fixer 91 in the form of the ellipse face each other, the aircraft 50 rotates to be inserted into the third fixer 91 and assists the aircraft 50 to detect an appropriate position. When the aircraft 50 lands, the power supply 26 and the data monitoring unit 25 provided on the lower portion of the landing platform are extended outwardly to be inserted into a groove of the aircraft 50 and perform charging and monitoring of the aircraft 50.

Figure 9:
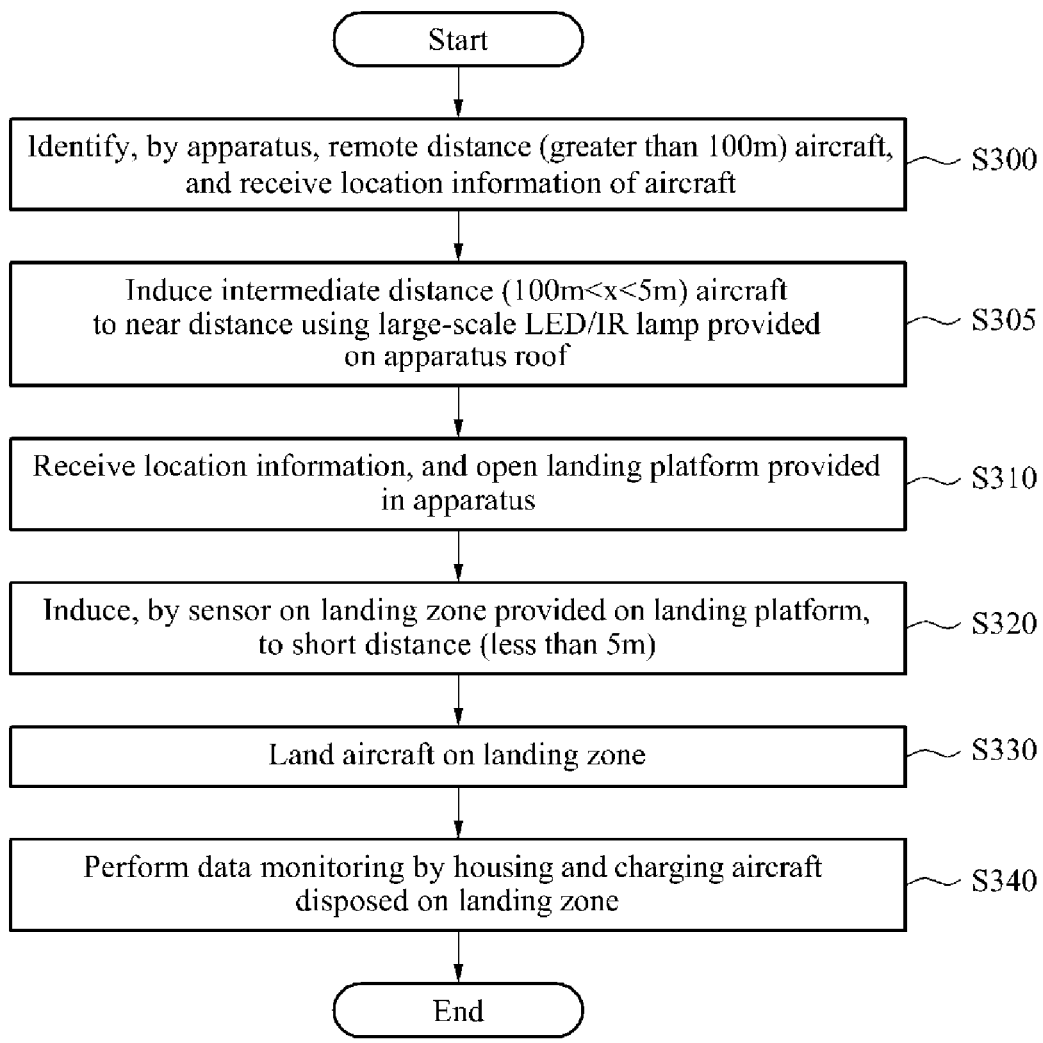
FIG. 9 is a flowchart illustrating a method of charging and housing of a portable apparatus according to an embodiment of the present invention.

FIG. 9 is a flowchart illustrating a method of charging and housing of a portable apparatus according to an embodiment of the present invention. In operation S300, the method of charging and housing of the portable apparatus includes identifying a remote distance aircraft at an altitude of 100 meters (m) and receiving location information of the aircraft. In operation S305, an intermediate distance aircraft at an altitude of 100 m<x<5 m is guided to a near distance, for example, less than 5 m, using large-scale LED/IR array lamps for a remote distance provided on a top portion of the apparatus In operation S310, a landing platform provided in the apparatus opens in response to receiving the location information. In operation S320, a sensor provided on the landing platform guides the aircraft from a near distance. In operation S330, the aircraft lands on the landing platform. In operation S340, the aircraft disposed on the landing platform is housed and charged, and monitoring state data is performed on the aircraft.

In operation S300 in which the apparatus identifies the remote distance aircraft and receives the location information of the aircraft, the location information of the aircraft is exchanged between the apparatus and the aircraft using a reflector antenna to conduct satellite communication with a top portion of the apparatus, a phase array antenna to trace a flight path of multiple unmanned aircrafts and communicate with the multiple unmanned aircrafts, and an omni-antenna for communication with the multiple unmanned aircrafts. For example, a vertically movable Lidar is provided inside the phase array antenna. The Lidar springs out as necessary to be used to detect landmarks for calculation of an optimum flight path of the aircraft by scanning a neighboring terrain.

The aircraft at the intermediate distance is guided to a near distance using the large-scale LED/IR array lamps, and the location information is received through communication between the antenna and the aircraft to open the landing platform provided in the portable apparatus. Descriptions previously provided with reference to FIGS. 1 through 4 may be applied to the operating of the landing platform, and thus, repeated descriptions will be omitted here for conciseness.

When the landing platform opens parallel to a ground and a landing port is designated, the aircraft stands by near the landing port. In operation S320, a location of the aircraft is estimated and landing of the aircraft is guided, using a Lidar, for example, a pulse laser precise position determination sensor for a near distance, a vision sensor for a near distance, and a sonar sensor for a near distance. The small-sized LED/IR array lamps for a near distance to assist in automatic landing of the aircraft is provided to enable LED elements to generate a unique pattern during a day and enable an IR ray element to generate a unique pattern during a night to guide landing of the aircraft. Accordingly, the aircraft recognizes the unique patterns generated, and moves to an appropriate landing position.

In operation S330, the aircraft lands on a landing zone. In operation S340, the latches 24 provided on the landing zone fix the aircraft, and perform charging, housing, and state data monitoring on the aircraft.

A portable apparatus for charging and housing charges and houses a plurality of aircrafts. A station for charging and housing is provided in a portable form equipped with a mobility rather than in a fixed form. Accordingly, the portable apparatus is efficient in such implementations in which a scope of activities is restricted due to a battery limit, and has an advantage of moving the plurality of aircrafts.

Figure 10:
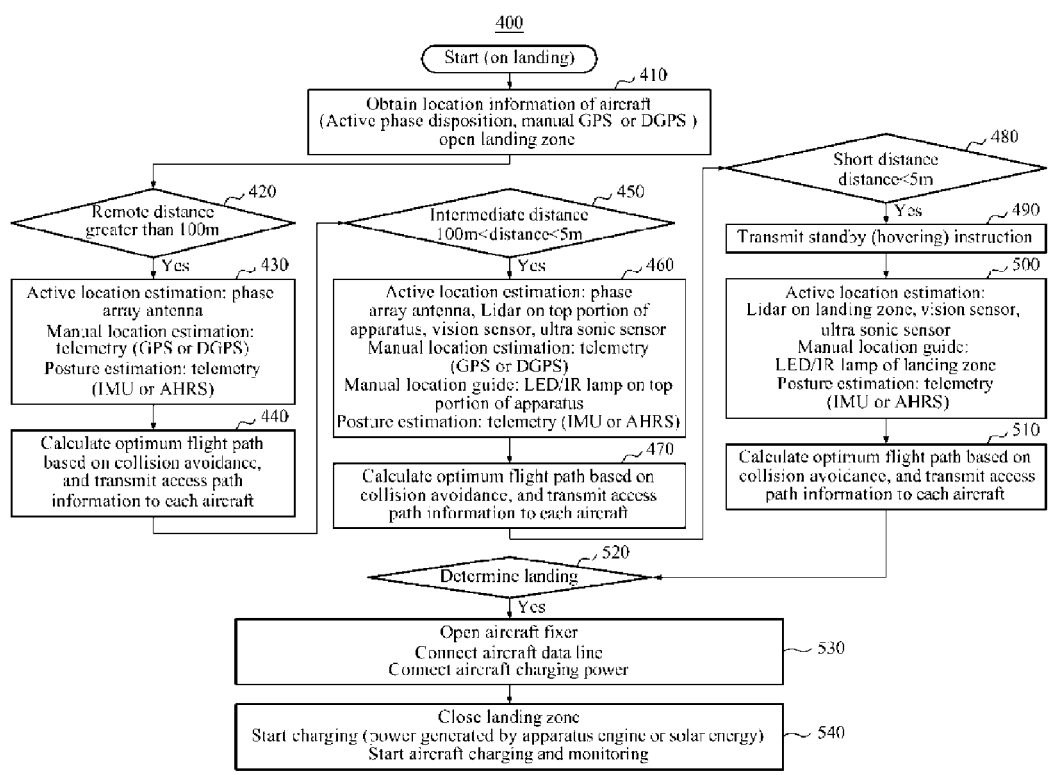
FIG. 10 is a flowchart illustrating an example in which a remote distance aircraft is guided to land on a landing zone according to an embodiment of the present invention.

FIG. 10 is a flowchart illustrating a method 400 of housing an aircraft in a portable apparatus for housing according to an embodiment of the present invention. In operation 410, a portable apparatus identifies a remote distance aircraft, receives location information of the aircraft using an active phase array antenna, or a GPS or DGPS receiver, and opens a landing platform parallel to a ground so as to provide a landing zone.

When the aircraft is 100 m away from the landing platform in operation 420, a phase array antenna, provided on a top portion of the portable apparatus, that traces a flight path of an unmanned aircraft and communicates with the aircraft for active location estimation searches the aircraft, or receives location information calculated by a GPS or DGPS receiver provided in the aircraft and inertial measurement unit (IMU) and attitude heading reference system (AHRS) information transmitted from the aircraft to use for active guidance of the aircraft in operation 430. In operation 440, an optimum flight path to an access destination is calculated based on collision avoidance amongst a plurality of aircrafts, and flight path information is transmitted to the aircraft. Conditions check of a surrounding neighborhood is conducted amongst central base stations or apparatuses using a satellite communication antenna.

When a distance between the aircraft and the landing platform is relatively intermediate, for example, 100 m<distance<5 m, in operation 450, a 3D stereoscopic map of a neighboring terrain is created using a Lidar to implement a landing platform landmark in a 3D image, and an unmanned aircraft is guided using the LED/IR array lamps, a vision sensor, and a ultra sonic sensor to obtain position and attitude information of the aircraft When the location information of the aircraft is transceived between the aircraft and the apparatus based on telemetry, and the aircraft moves adjacent to the landing platform, a unique pattern of the LED/IR array lamps on a top portion of the apparatus, for example, a predetermined pattern to allow an aircraft to identify a location of the aircraft, is formed, and the IMU and AHRS information transmitted from the aircraft is received to be used for active guidance of the aircraft in operation 460. In operation 470, an optimum flight path to a landing zone is calculated based on collision avoidance amongst aircrafts in an intermediate distance, and access flight path information is transmitted to the aircraft.

When the aircraft moves nearby the landing zone within a 5 m distance apart from the landing zone in operation 480, a standby, for example, hovering, instruction is transmitted in operation 490 to guide landing using a vision sensor or an ultrasonic sensor. When the LED/IR array lamps provided on the landing zone emits light, the aircraft estimates the attitude and altitude data and location information of the aircraft, and prepares to land. In operation 500, the IMU and AHRS information transmitted from the aircraft is received to be used for active guidance of the aircraft. In operation 510, the LED/IR array lamps provided on the landing zone emit light to guide safe landing of the aircraft, calculates the optimum flight path to avoid a collision with another aircraft is calculated, and the access path information is transmitted to the aircraft to avoid a collision with another aircraft. In operation 520, the aircraft determines to land on the landing zone, and completes a landing.

In operation 530, when the aircraft lands on the landing zone, latches on both sides of a fixer provided in a form of a cone or a cylinder are inserted into the aircraft, connect a data line to perform monitoring on the aircraft, and connect a power supply line using another latch to supply power for charging and housing of the aircraft.

In operation 540, when the aircraft is connected to the fixer provided on the landing zone on which the aircraft is disposed, a lateral landing platform and a rear landing platform of the apparatus close. An outer surface of the apparatus is provided with a solar panel, such that the aircraft is charged and monitored using solar energy. Charging of the aircraft is performed by an engine of the apparatus or a transport vehicle/ship containing the apparatus.

Figure 11:
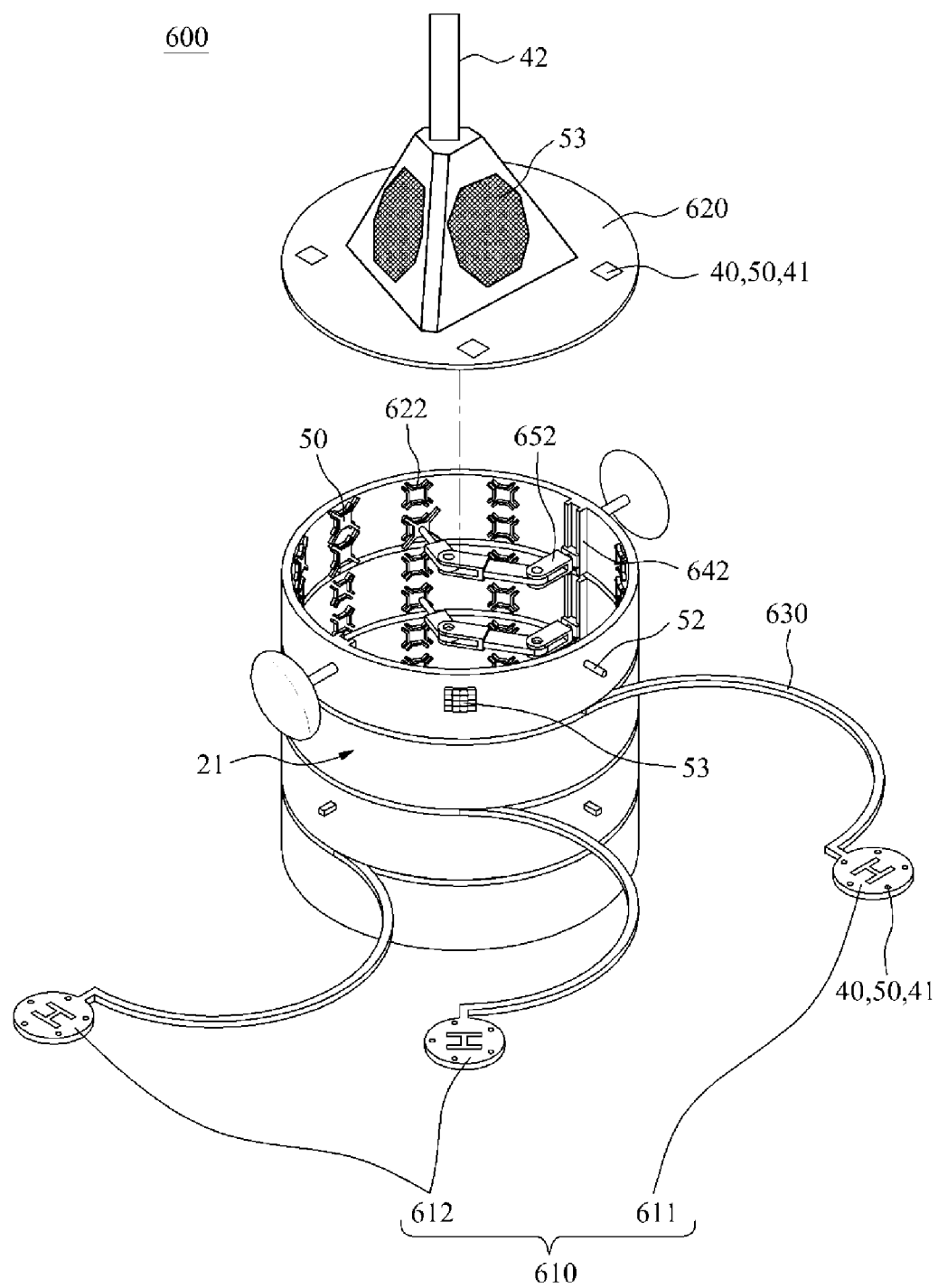
FIG. 11 is a configuration diagram illustrating an apparatus for charging and housing in a tower type according to an embodiment of the present invention.

In a dissimilar manner to FIGS. 1 through 10, an apparatus for charging and housing of an aircraft in a fixed type of a tower may also be provided. FIG. 11 is a configuration diagram illustrating an apparatus 600 for charging and housing in a fixed tower type according to an embodiment of the present invention. When a sensor detects the aircraft 50 approaching, subsequent to a mission being completed, the sensor extends an open type landing platform 610 towards a landing port. The open type landing platform 610 disposed inside the apparatus 600 moves outside the apparatus 600 via a bridge 630.

When the aircraft 50 safely lands on the open type landing platform 610 via a plurality of sensors provided on the open type landing platform 610, the bridge 630 is folded. A robotic arm 650 is bonded to the aircraft 50 using a socket to move the aircraft 50 having an anomaly to a maintenance room 660, and move the aircraft 50 in need of charging and monitoring to a housing portion 622. The above process is automatically performed for an unmanned aircraft to take-off and/or land and to be charged.

The vision sensor 40, a sonar sensor, an IR sensor, a beacon signal, a DGPS or GPS receiver, the LED/IR array lamps 41, the ultra sonic sensor 55 are provided on the landing platform to detect approaching of the aircraft 50. A Lidar is used to perform 3D scanning on a neighboring terrain. In addition, an omni-antenna, a reflector antenna for satellite communication, a phase array antenna to trace and communicate with a plurality of aircrafts, or a DGPS or GPS device are also provided to communicate with the aircraft 50.

Figure 12:
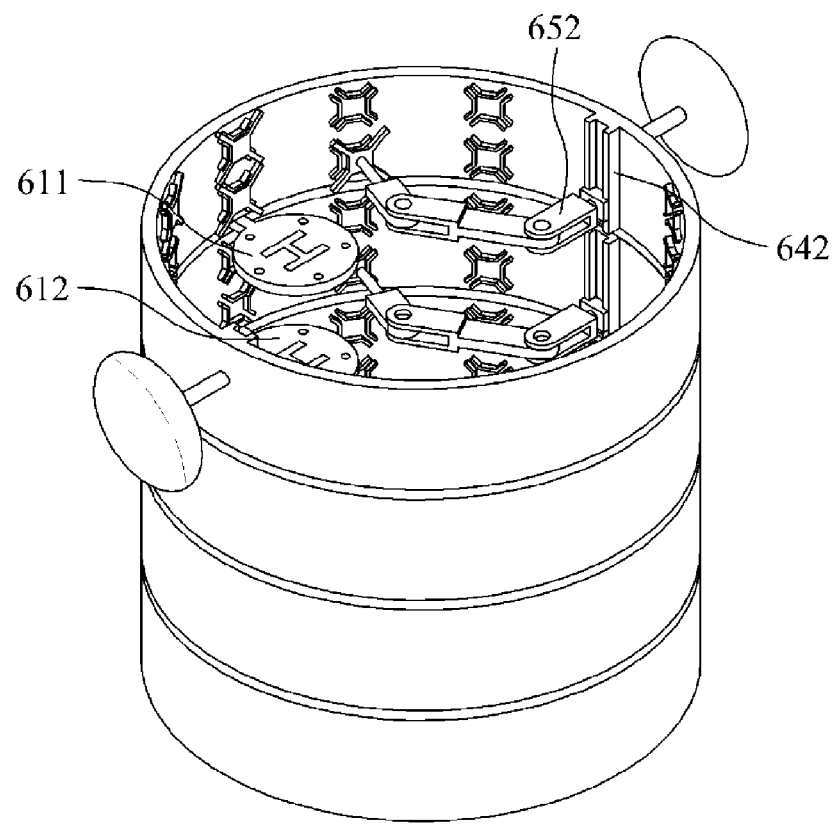
FIG. 12 is a diagram illustrating an inner structure of an apparatus for charging and housing in a tower type according to an embodiment of the present invention.

Hereinafter, an inner structure of the apparatus 600 for charging and housing in the tower type will be described with reference to FIG. 12. The aircraft 50 is disposed on a landing port external to the apparatus 600, and the open type landing platform 610 opens to sit the aircraft 50 on the open type landing platform 610. The bridge 630 is folded into the apparatus 600 to allow the aircraft 50 to be disposed inside the apparatus 600. The robotic arm 650 moves horizontally and vertically via an elevator 640 provided inside the apparatus 600 so as to house and charge the aircraft 50 having a depleted battery through socket or grab type connection and perform state data monitoring. For example, the robotic arm 650 moves the aircraft 50 having an anomaly to the maintenance room 660 for repairs.

The apparatus 600 of which a height is longer than a width may include a cross-section provided in a form of a circle or square. The bridge 630 to open the open type landing platform 610 externally to the apparatus 600 and foldable into the apparatus 600 is provided apart by a diameter of the apparatus 600, thus allowing a space for safe take-off and/or landing.

The plurality of open type landing platforms 610 is accommodated vertically at both sides of the apparatus 600, and provided at predetermined intervals apart from each other. An integrated structure of the phase array antenna 53 in a large-scale and the Lidar 42 is provided on a top of the open type landing platform 610, and a lower portion of the open type landing platform 610 is provided to be used for housing and charging. The maintenance room 660 is provided on a bottom of the open type landing platform 610 so as to allow a human to directly maintain or repair the aircraft 50 moved by the robotic arm 650.

The robotic arm 650 includes a multi-layer robotic arm 651 and a single-layer robotic arm 652. The multi-layer robotic arm 651 moves via a multi-layer elevator 641 to move the aircraft 50 having an anomaly to a bottom layer. Also, a plurality of robotic arms is provided for each layer to enable an operation using a single-layer elevator 642, thus simultaneously housing a plurality of unmanned aircrafts.

Figure 13:
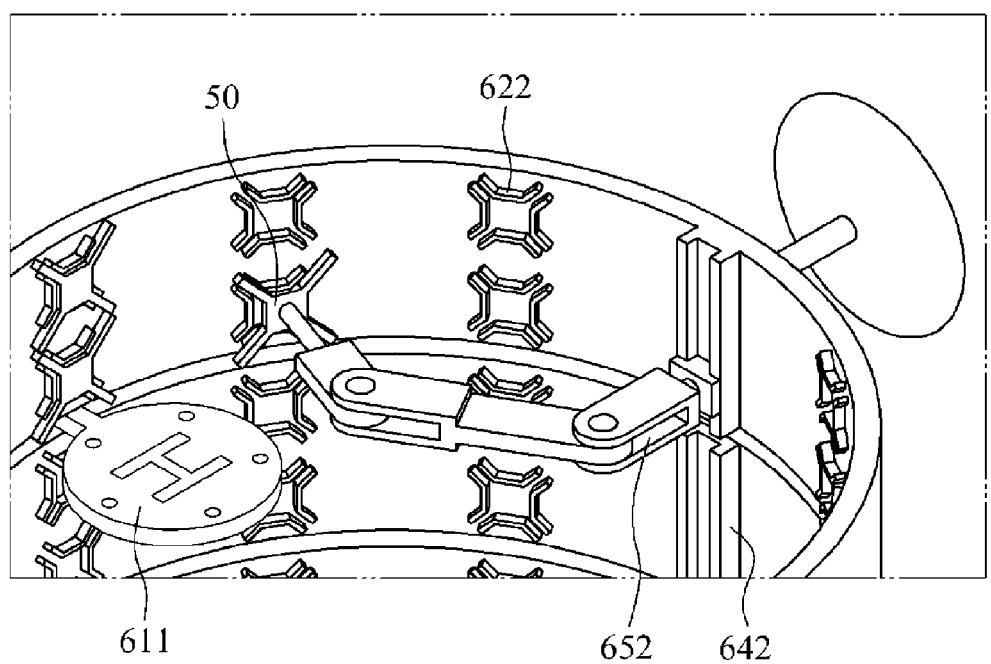
FIG. 13 is a phase diagram illustrating an example of disposing an unmanned aircraft in an apparatus for housing according to an embodiment of the present invention.
Figure 14:
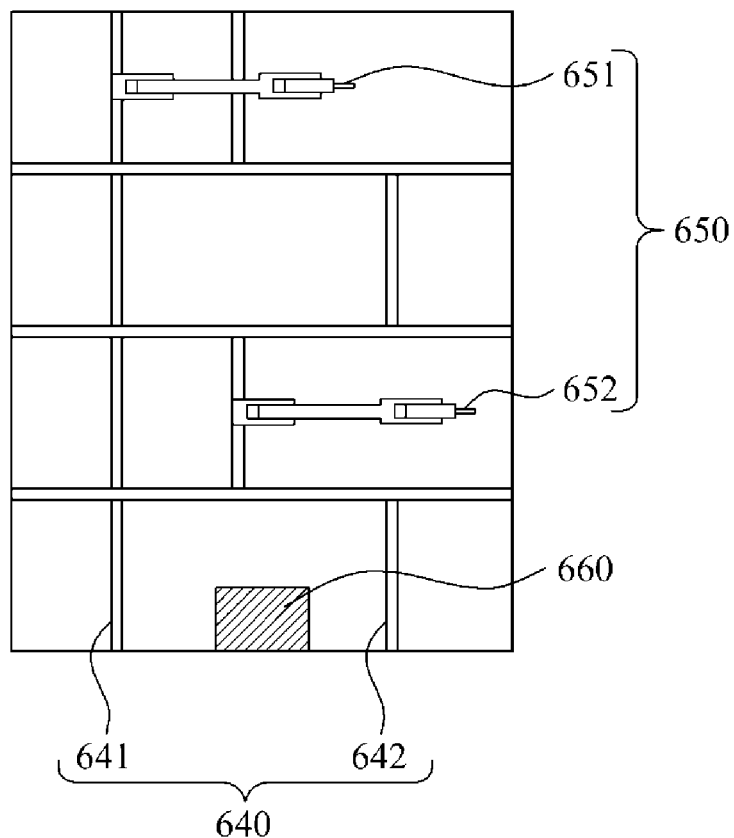
FIG. 14 is a configuration diagram illustrating a layer disposition of an apparatus for charging and housing in a tower type according to an embodiment of the present invention.

FIG. 13 is an overview of the apparatus 600, and FIG. 14 is a configuration diagram illustrating a robotic arm moving vertically and horizontally via an elevator and a layer disposition of the apparatus 600 according to an embodiment of the present invention. When the bridge 630 is folded into the apparatus 600 to dispose the aircraft 50 inside the apparatus 600, the robotic arm 652 moves via the horizontal and vertical elevator 642 provided inside the apparatus 600 so as to house and charge the aircraft 50 having a depleted battery through socket or grab type connection and perform state data monitoring. For example, the robotic arm 652 performs charging and monitoring by grabbing the aircraft 50 using a socket or a grab to connect to a housing portion.

Examples of such robotic arms may include the multi-layer robotic arm 651 and the single-layer robotic arm 652. The multi-layer robotic arm 651 moves via the multi-layer elevator 641, and moves the aircraft 50 in which an anomaly exists to a bottom layer. The single-layer robotic arm 652 using the single-layer elevator 642 is used for monitoring or charging in normal circumstances to house and charge the aircraft 50.

The plurality of aircrafts 50 returning subsequent to completing a mission is disposed on an open type landing platform 611 including the bridge 630. When the aircrafts 50 safely and automatically land on the open type landing platform 611 using a plurality of sensors provided in the open type landing platform 611, the bridge 630 is folded into the apparatus 600. The robotic arm 652 enables housing and charging of the aircraft 50 through a socket or grab type connection to the aircraft 50 using a horizontally and vertically moving elevator.

The integrated structure of the phase array antenna 53 and the Lidar 42 is provided on the landing portion 620 on a top of the apparatus 600, and an open type landing platform 612 in a small-size is provided below the integrated structure for housing and charging of the aircraft 50. The maintenance room 660 is provided on a bottom layer to allow a human to directly maintain or repair the aircraft 50 moved by the robotic arm 650.

According to the present embodiments, there is provided a station for charging and housing of a plurality of aircrafts in a tower type or in a portable type that enables automatic take-off and/or landing through communication using a sensor or an antenna, charging batteries of a plurality of aircrafts having a restricted scope of activities due to a battery limit, and increased efficiency in space utilization and operation.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An apparatus for charging and housing of an aircraft, the apparatus comprising:
   a landing platform to be provided at a side of the apparatus, and on which the aircraft lands;
   a housing portion to monitor state data of the aircraft, and to house and charge the aircraft; and
   a sensor to assist in landing of the aircraft by allowing the aircraft to communicate with the apparatus, wherein the sensor comprises an antenna and a component, wherein the component is configured to use light, is provided inside the antenna, is configured to move vertically to an upper portion of the antenna when in use for creating information associated with landing by implementing a three-dimensional (3D) map of a surrounding neighborhood, and is configured to move down to be inserted into a lower portion of the antenna when not in use.

2. The apparatus of claim 1,
   wherein the antenna is a phase array antenna,
   wherein the component is a Lidar, and
   wherein the sensor further comprises at least one of:
      an infrared (IR) ray sensor, a vision sensor, a sonar sensor, a beacon signal, a global positioning system (GPS) device or a differential global positioning system (DGPS) device, and light emitting diode (LED)/IR array lamps.

3. The apparatus of claim 1, wherein the sensor to assist in landing of the aircraft by allowing the aircraft to communicate with the apparatus comprises a communication device,
   wherein the communication device comprises at least one of:
      an omni-antenna or a reflector antenna for satellite communication, a phase array antenna to trace a flight path of the aircraft, and a DGPS device.

4. The apparatus of claim 1, wherein LED array lamps and IR array lamps are provided at a side of the landing platform
   wherein the LED array lamps and the IR array lamps are configured to enable an automatic landing of the aircraft, and
   wherein the LED array lamps are lamp is configured to generate a pattern during a daytime, and the IR array lamps are configured to generate a pattern during a nighttime, as necessary.

5. The apparatus of claim 1, wherein the apparatus is configured to accommodate a plurality of aircrafts and move the plurality of aircrafts,
   wherein the apparatus comprises:
      an upper landing platform to be disposed on a top portion of the apparatus, and provided with a phase array radar or a Lidar;
      a lateral landing platform to be disposed at a side portion of the apparatus, and provided with a landing zone; and
      a rear landing platform to be disposed at a rear portion of the apparatus, and provided with a landing zone,
      wherein the lateral landing platform or the rear landing platform is configured to open and close, and when the lateral landing platform or the rear landing platform is folded, the aircraft accommodated in the landing platform is housed and charged inside the apparatus.

6. The apparatus of claim 5, wherein the landing zone further comprises:
a fixer to be mechanically bonded to the aircraft.

7. The apparatus of claim 6, further comprising:
a latch in the fixer to be inserted and bonded to the aircraft.

8. The apparatus of claim 7, further comprising a power supply disposed in an outer peripheral portion of the landing zone,
wherein the latch is bonded to the aircraft, and
wherein the landing zone is configured to simultaneously perform power supplying or monitoring of the state data.

9. The apparatus of claim 1, further comprising:
an axis at a side of the apparatus,
wherein a leftward and rightward horizontal movement of the landing platform is centered on the axis to open outward horizontally to the apparatus.

10. The apparatus of claim 1, wherein a plurality of landing platforms is disposed vertically at differing positions, and opens outwardly in a form of a drawer.

11. The apparatus of claim 1, comprising:
a tower in which a plurality of aircraft is disposed;
a plurality of landing platforms configured to open horizontally;
a bridge to open the landing platforms externally to the tower;
a robotic arm disposed at a side of the tower and inside the apparatus to move the aircraft to the housing portion; and
an elevator provided in the tower to horizontally or vertically move the robotic arm.

12. The apparatus of claim 11, further comprising:
a maintenance room in the tower for a user to directly maintain the aircraft, or perform repairs in an occurrence of an anomaly in the aircraft.

13. The apparatus of claim 11, wherein the robotic arm further comprises at least one of a socket or a grab connector to connect the aircraft to the housing portion, and
the robotic arm is configured to move the aircraft to the housing portion.

14. A method of charging and housing of an aircraft, the method comprising:
identifying, using an apparatus for charging and housing of an aircraft, the aircraft and receiving information associated with a location of the aircraft;
guiding the aircraft towards a direction of the apparatus;
opening of a landing platform provided in the apparatus;
landing of the aircraft on the landing platform; and
housing and charging the aircraft and monitoring state data of the aircraft,
wherein the guiding the aircraft or the landing of the aircraft uses a sensor that comprises a phase array antenna and a Lidar, wherein the Lidar is configured to move with respect to the antenna, and
wherein the landing of the aircraft on the landing platform, or the guiding of the aircraft towards the direction of the apparatus further comprises use of at least one of:
a vision sensor, a sonar sensor, a beacon signal, light emitting diode (LED)/infrared (IR) array lamps, an omni-antenna, a reflector antenna, and a global positioning system (GPS) device or a differential global positioning system (DGPS) device.

15. The method of claim 14, wherein the landing of the aircraft on the landing platform comprises:
calculating an optimal route based on collision avoidance amongst a plurality of aircrafts until the aircraft lands on the landing platform, and transmitting an access route to the aircraft.

16. The method of claim 14, wherein the identifying of the aircraft and receiving the information associated with the location of the aircraft, and the guiding of the aircraft towards the direction of the apparatus comprises:
using the aircraft location information in determining a landing route using a GPS or a DGPS device provided inside the aircraft, and
using the aircraft location information in active controlling of the aircraft and determining the landing route by receiving information associated with altitude data from an inertial measurement unit (IMU) or attitude data and a heading angle received from an attitude heading reference system (AHRS).

17. The method of claim 14, wherein the landing of the aircraft on the landing platform comprises:
landing of the aircraft when the landing platform is disposed parallel to a ground, and
wherein the aircraft is configured to take off when the landing platform is disposed parallel to the ground.

18. The apparatus of claim 14, wherein the Lidar is provided inside the phase array antenna, and is configured to vertically move to an upper portion of the phase array antenna when in use to be used for creating information associated with landing by implementing a three-dimensional (3D) map of a surrounding neighborhood, and is configured to move down to be inserted into a lower portion of the phase array antenna when not in use.

19. An apparatus for charging and housing of an aircraft, the apparatus comprising:
a landing platform to be provided at a side of the apparatus, and on which the aircraft lands;
a housing portion to monitor state data of the aircraft, and to house and charge the aircraft; and
a sensor to assist in landing of the aircraft by allowing the aircraft to communicate with the apparatus, wherein the sensor comprises a phase array antenna and a Lidar, wherein the Lidar is configured to move with respect to the phase array antenna,
wherein the sensor further comprises at least one of:
an infrared (IR) ray sensor, a vision sensor, a sonar sensor, a beacon signal, a global positioning system (GPS) device or a differential global positioning system (DGPS) device, and light emitting diode (LED)/IR array lamps.

* * * * *